United States Patent
Beatty et al.

(10) Patent No.: US 6,819,965 B2
(45) Date of Patent: Nov. 16, 2004

(54) ELECTRONIC WORK INSTRUCTION OBJECT ORIENTED SYSTEM AND METHOD

(75) Inventors: James K. Beatty, Jasper, ID (US); Dennis Thimling, Jasper, ID (US); Terence Walsh, Naperville, IL (US)

(73) Assignee: Kimball International, Inc., Jasper, IN (US)

( * ) Notice: Subject to any disclaimer, the term of this patent is extended or adjusted under 35 U.S.C. 154(b) by 55 days.

(21) Appl. No.: 10/237,936

(22) Filed: Sep. 9, 2002

(65) Prior Publication Data

US 2004/0049307 A1 Mar. 11, 2004

(51) Int. Cl.[7] .......................... G06F 19/00; G05D 15/00
(52) U.S. Cl. .......................... 700/97; 700/83; 700/180
(58) Field of Search .............................. 700/17.83, 96, 700/97, 180, 185, 17, 83

(56) References Cited

U.S. PATENT DOCUMENTS

| | | | |
|---|---|---|---|
| 4,827,423 A | * 5/1989 | Beasley et al. | ................ 700/96 |
| 4,845,634 A | * 7/1989 | Vitek et al. | .................... 700/97 |
| 4,961,148 A | * 10/1990 | Holda et al. | ................... 700/97 |
| 5,649,220 A | 7/1997 | Yosefi | |
| 5,777,876 A | * 7/1998 | Beauchesne | ................. 700/95 |
| 5,847,971 A | 12/1998 | Ladner et al. | |
| 5,878,398 A | 3/1999 | Tokuda et al. | |
| 5,905,496 A | 5/1999 | Lau et al. | |
| 6,002,855 A | 12/1999 | Ladner et al. | |
| 6,006,193 A | 12/1999 | Gibson et al. | |
| 6,026,365 A | 2/2000 | Hayashi | |
| 6,032,124 A | 2/2000 | Saito et al. | |
| 6,073,109 A | 6/2000 | Flores et al. | |
| 6,240,328 B1 | 5/2001 | LaLonde et al. | |
| 6,292,707 B1 | 9/2001 | Hair et al. | |
| 6,314,425 B1 | 11/2001 | Serbinis et al. | |
| 6,321,133 B1 | 11/2001 | Smirnov et al. | |
| 6,477,437 B1 | * 11/2002 | Hirota | ......................... 700/95 |
| 6,750,884 B1 | * 6/2004 | Steigerwald et al. | ........ 345/771 |
| 2002/0045964 A1 | * 4/2002 | Nakajima et al. | ........... 700/104 |
| 2002/0051008 A1 | * 5/2002 | Mathis et al. | ................ 345/705 |
| 2003/0088551 A1 | * 5/2003 | Tong | ............................ 707/3 |

OTHER PUBLICATIONS

Wolter, Jan D., 1991, pp 263–288, Computer–Aided Mechanical Assembly Planning, Chapter II, "*On the automatic generation of assembly plans*".

Hayata, Kitazawa et al., 1992, pp 14–19, The Eighth Conference on Artifical Intelligence for Applications, "*Intelligent Document Generation System for Construction Planning*".

(List continued on next page.)

*Primary Examiner*—Albert W. Paladini
*Assistant Examiner*—Elliot L Frank
(74) *Attorney, Agent, or Firm*—Baker & Daniels

(57) ABSTRACT

The present invention involves a method and system for manufacturing documentation for standardizing product manufacturing in an enterprise. The system creates data records representing work instructions, stores the data records in a database and enables the system's users to search the database for specific data records to view, edit, re-use or copy. The data records include process design data having both a fixed (bit-mapped) graphical component and a modifiable (object-oriented) graphical component, and the system enables one group of users to view the fixed graphical component and another group of users to both view and/or modify the modifiable graphical component. In order to maintain control over edits made to data records, the system maintains a log of additions, changes or deletions made to the data records.

41 Claims, 9 Drawing Sheets

OTHER PUBLICATIONS

Deshmukh, Abhijit et al., 1993, pp 269–284, Journal of Intelligent Manufacturing, "*Automated generation of assembly sequence based on geometric and functional reasoning*".

Lee, Inho, 1996, pp 2243–2252 "*Automated Generation of Documents Including Illustrations as Communication Media—A Case of Generating an Assembly Manual*".

Binbasioglu, Meral et al., 2000, pp 453–463, Information Systems vol. 25, Nos. 6–7 "*A System for Supporting Organizations in Knowledge–Based Document Preparation*".

Barua, Guatam et al., 2001, pp 74–81 Page Cube: A Model for Storage and Retrieval of Documents Relevant to a Document Production Workflow in an Office.

Mok, Swee et al., 2001, pp. 313–318, Proceedings of the 2001 IEEE International Conference on Robotics & Automation, Seoul, Korea, "*Automatic Generation of Assembly Instructions Using STEP*".

Guo–ning. Jun–he et al., 2002, Computer Integrated Manufacturing Systems, vol. 8, No. 1, pp 12–15 "*A Method of Product Modeling for Mass Customization*" with English translation.

Matsumoto, Mori et al., 1990, "*System Configuration Assistant Expert System*" (article unavailable).

Mandie, Puzar, 1995, "*A Methodology of Generating Documents in Electrical Machine Design Software*" (article unavailable).

URL:www.cabinetng.com/features/htm, Apr. 12, 2002.

URL: www.ipicorp.com/Products/Scrittura/body_scrittura.html, Apr. 12, 2002.

URL: www.cyco.com/amworkflow, Apr. 12, 2002.

URL:www.iasinc.net/documentmanagement/edmservices.asp, Apr. 12, 2002.

URL: www.acssoftware.com/html/version_6_5.html, Apr. 12, 2002.

URL: www.medplus.com/products–services/chartmaxx_product–software.htm, Apr. 12, 2002.

URL: www.summithq.com/products/areas/operations/docgen.html, Apr. 12, 2002.

URL: www.integic.com, Apr. 12, 2002.

URL: www.ensoftek.com/products2.htm, Apr. 12, 2002.

\* cited by examiner

| CREATOR | | | | | PCO # | | | | | | DATE | |
|---|---|---|---|---|---|---|---|---|---|---|---|---|
| PROCESS FAMILY | | | SEQUENCE OF EVENTS | | | | | | | | PROCESS I.D. | |
| CPT # | SEQ # | TASK DECRIPTION | V.A. | SETUP | | | | REQUIRED | | MOVE | | | | QUALITY INFO. |
| | | | | LABOR | MACHINE | D/S | QTY | INT/EXT | LABOR | MACHINE | D/S | QTY | INT/EXT | DISTANCE | TQC | TQC DESCRIPTION |

ELECTRONIC WORK INSTRUCTION OBJECT ORIENTED SYSTEM AND METHOD

BACKGROUND OF THE INVENTION

1. Field of the Invention

The invention relates to manufacturing products using process standardization. More specifically, the field of the invention is that of electronic work instruction systems.

2. Description of the Related Art

In today's manufacturing industry, product manufacturers must manufacture their products faster than they were once able to do in the past. Customers are much more demanding and expect their products to be manufactured and presented to them in a timely manner, no matter the difficulty of the manufacturing process. In an effort to manufacture higher volumes of products at faster rates, many manufacturers are implementing high velocity, quick response order-to-delivery processes. In this way, the manufacturers are able to simultaneously keep their customers satisfied while obtaining more business as well. To achieve these results, many manufacturers are using the Demand Flow® manufacturing methodology. (Demand Flow® is a registered trademark of the John Costanza Institute of Technology, Inc. of Englewood, Colo.).

The Demand Flow® methodology represents a reorientation of manufacturing processes from a scheduled approach (represented by Manufacturing Resource Planning and Enterprise-Wide Resource Planning methodologies) to a flow-based process methodology. Demand Flow® eliminates many aspects of the schedule environment, such as stage work areas, multi-level bills of material and extensive stockpiling of material inventories. Total Quality Control ("TQC") methods are also designed into the process so that quality is addressed within each step of the manufacturing process.

The Demand Flow® methodology requires the creation of a TQC Sequence of Events ("SOE") document that describes the tasks required to create a product. The time it takes to setup, run and move the product is also captured. Additionally, quality criteria are defined for each work step to manufacture the product. All work tasks must be defined on the SOE document for each product.

Another key component of the Demand Flow® methodology is the creation of an Operational Method Sheet ("OMS") document. An OMS document represents the documentation of work tasks completed within the Demand Flow® process, along with verification/inspection of specific quality criteria of the products. The SOE documents are used by process engineering in the development of the OMS document and as a database to keep track of process times. Collectively, SOE documents and OMS documents are known as electronic work instructions ("EWIs").

After tasks have been identified within a process and documented in the SOE document, Operational Definition takes place. Operational Definition is the process of grouping tasks on the SOE document together until the total time is at or below the "takt" time for the process (the "takt" time is the rate at which the manufacturer's customer requires the product). This grouping of tasks then becomes the work content of the operation, and the work content is manifested on the OMS document in the form of a graphical illustration.

An SOE document and corresponding OMS document can be used for more than one model in certain instances. The Process/Model Matrix Sheet ("PMS") is used to tie the process driven OMS and SOE documents to product model numbers that are produced by doing the work described within them. This allows multiple models that require the same work and times within a process to use the same process documentation.

In the manufacturing environment, process engineers and plant workers work independently to produce a product. Engineers are often located in multiple locations different from those multiple sites at which the manufacturing plants are located, and this occurrence, in addition to all of the possible variations of these differences in locality, make it very difficult for engineers and shop floor workers to work together to efficiently manufacture a product. The use of the Demand Flow® methodology provides for the creation of EWIs by process engineers, and EWIs serve as a source which plant workers may reference in order to manufacture the product in the plant. Even with the implementation of the Demand Flow® methodology and its use of SOE and OMS documents, however, manufacturers are still recognizing a gap in their demand flow and supply systems. The supplying of products in an efficient and voluminous manner is often hindered due to the non-standardized manufacturing of products established within many manufacturing environments.

EWIs are often created by different process engineers within the same manufacturing environment. For this reason, EWIs may differ in appearance and/or substantive material. EWIs also may undergo many revisions during the course of the manufacturing process. It is not uncommon for manufacturers to store multiple versions of the EWIs in a system which has no means of classifying the different EWI versions. This creates unnecessary delays when it comes time for process engineers to create new EWIs for a product to be manufactured. These problems adversely affect the efficient manufacturing-capability of manufacturers. Improvement is needed in standardizing the manufacturing of products.

SUMMARY OF THE INVENTION

The present invention is a method and system for manufacturing documentation for standardizing product manufacturing in an enterprise. The system has data records that include both a fixed graphical component and a modifiable graphical component. The fixed graphical component is viewable by manufacturing shop floor personnel and the modifiable graphical component is viewable and/or editable by engineering personnel.

In the present invention, a method and system enables the production, storage, access and display of EWI documents from a central file repository, accessible over a network to individuals within an enterprise no matter where the individuals are physically located. The method and system enable its users to perform different functions, including: creating and storing new EWI documents in the central file repository; accessing and managing EWI documents located in the central repository; displaying and/or printing EWI documents at user workstations located within different manufacturing plants; searching the central repository of EWI documents to identify the documents required for tasks to complete; and revising and maintaining control over all EWI documents stored in the system, including specific graphical illustrations that are used as components of the OMS documents. In this way, the EWI documents created by engineering personnel in one facility may be re-used or copied by engineering personnel located in another facility.

In the present invention, a method and system creates a data record representing electronic work instructions, and the data record includes process design data. The process design data pertains to OMS documents. The process design data includes a fixed graphical component and a modifiable graphical component. In an exemplary embodiment of the present invention, the fixed graphical component is a display file, and the modifiable graphical component is a source file. In one form of the present invention, the data record is stored in the central file repository. The central file repository is accessible by a server, and the server is accessible over a network by one or more computer workstations housed in manufacturing plants located in different geographical locations. In one form of the present invention, the network includes a publicly accessible network like the internet. In another form of the present invention, the network includes a private network, for example, a virtual private network. The server which accesses the central file repository creates user groups and provides the user groups with access rights predetermined by the enterprise. These access rights enable the user groups to view and/or edit the data records stored in the central file repository. The present invention enables a user to search the central file repository to identify a data record for viewing or editing, depending on the user's access rights.

In the present invention, a method and system provides the display file to a first group of individuals of the enterprise who have access rights enabling them to view the display file. This group of individuals often consists of manufacturing plant personnel or shop floor workers. The display file is uploaded to the system as a GIF file and is used as the display illustration for an OMS document. In this way, the manufacturing plant personnel may view the OMS document containing the display illustration on the manufacturing plant floor as they assemble a product being manufactured. In one form of the present invention, the display illustration includes pictorial data, including, among others, scanned images or a digital photos.

In the present invention, a method and system provides the source file to a second group of individuals of the enterprise who have access rights enabling them to both view and modify the source illustration. This group of individuals often consists of process engineers who draft process designs used by manufacturing plant personnel to assemble products. The source illustration is uploaded to the system as a graphics file and is used for source reference. If the source illustration needs to be modified, it is then downloaded back to the software application used to create it. Lastly, when the modifications are made, the source illustration is then uploaded back to the EWI system for OMS usage. In this way, process engineers may use the source illustration while they create process designs, and they may also modify the process designs as necessary. In one form of the present invention, the source illustration includes a vector image created using an illustration program, e.g., Adobe Illustrator® ("AI") image (Adobe, Illustrator and Adobe Illustrator is a registered trademark of Adobe Systems Incorporated of Palto Alto, Calif.). In another form of the present invention, the source illustration includes a vector image created using a CAD program, e.g., AutoCAD® (AutoCAD is a registered trademark of Autodesk Inc. of Sausalito, Calif.).

Another aspect of the invention relates to a machine-readable program storage device for storing encoded instructions for a method of manufacturing documentation for standardizing product manufacturing in an enterprise according to the foregoing method.

In one form thereof, the present invention provides a method of manufacturing documentation for standardizing product manufacturing in an enterprise, including the steps of creating a data record representing work instructions, the data record including process design data, the process design data having a fixed graphical component, and a modifiable graphical component; providing the fixed graphical component of the process design data to a first group of individuals of the enterprise for viewing; and providing the modifiable graphical component of the process design data to a second group of individuals of the enterprise for at least one of viewing and modification.

In another form thereof, the present invention provides a product manufacturing information system for an enterprise, including a server accessible by individuals of the enterprise; a database accessible by the server, the database including a data record, the data record including process design data, the process design data having a fixed graphical component and a modifiable graphical component, the server further having access software, the access software limiting access to the modifiable graphical component to a predetermined group of individuals in the enterprise.

In another form thereof, the present invention provides a machine-readable program storage device for storing encoded instructions for a method of manufacturing documentation for standardizing product manufacturing in an enterprise, including the steps of: creating a data record representing work instructions, the data record including process design data, the process design data having a fixed graphical component, and a modifiable graphical component; providing the fixed graphical component of the process design data to a first group of individuals of the enterprise for viewing; and providing the modifiable graphical component of the process design data to a second group of individuals of the enterprise for at least one of viewing and modification.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 9 is an example of the printed version of a SOE document created using the SOE data entry page displayed in FIG. 5.

FIG. 10 is an example of the printed version of an OMS document created using the OMS data entry page displayed in FIG. 6.

Figure 1:
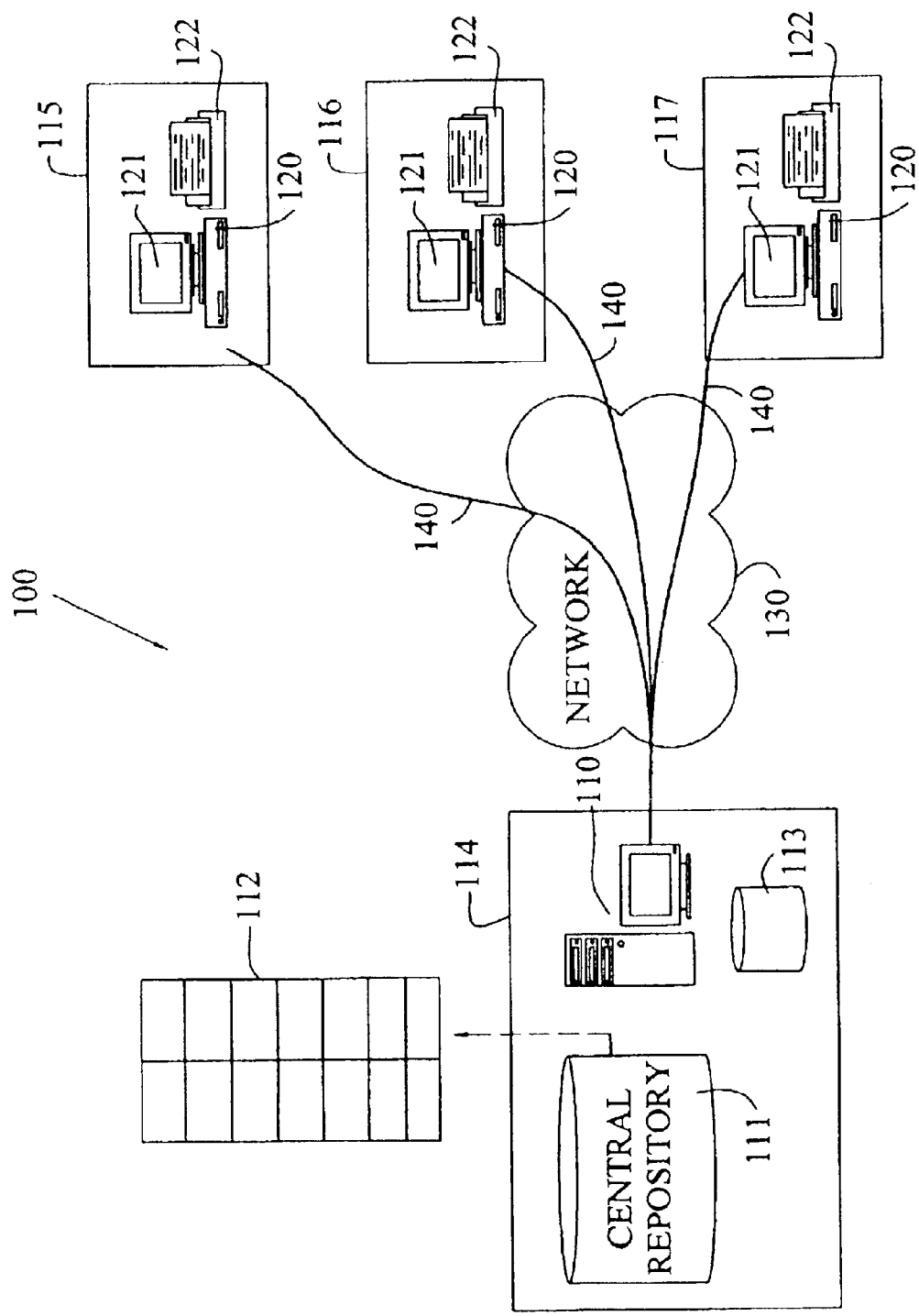
FIG. 1 is a schematic diagram of the operation of system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. The term "virtual private network" or "VPN" means a secure, private communication tunnel between two or more private networks across a publicly accessed network, e.g., the internet. The benefit of VPN use is that they are able to use public networks in lieu of expensive, privately-leased lines. Even though a virtual private network's data travels across a public network, the data is secure because of strong encryption. VPN's also monitor their data traffic to ensure that data packets do not get altered while being transmitted across the public network.

In such computer networks, typically one or more computers operate as a "server", a computer with large storage devices such as hard disk drives and communication hardware to operate peripheral devices such as printers or modems. A "VPN server" is a piece of software or hardware that acts as a gateway into either a whole network or a single computer. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output. The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a world wide network of computers, namely "Internet." A part of the internet, the "World Wide Web" or simply the "web," is a subset of the world wide network of computers on the internet that are connected to each other such that those computers and their contents are easily accessible to each other. Examples of Browsers compatible with the present invention include the Navigator program sold by Netscape Communications, an AOL Time Warner company, and the E Microsoft Internet Explorer program sold by Microsoft Corporation (Navigator and E Microsoft Internet Explorer are registered trademarks of their respective owners). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the web, and allow the Browsers to display text, images, and play audio and video recordings. The web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

A location or site on either the web or internet is known as a web site or "site." Web sites contain a "home page," and a home page is the first document a user sees when they enter a web site. Most web sites contain additional documents and files known as web pages. A "hyperlink" is an element in an electronic document on the web that links to another place on the web, whether it be to another electronic document within the web site or to another web site. In most instances, the web page viewer clicks on a hyperlink to follow the link. Hyperlinks may appear in the form of a word, phrase, icon or picture.

Many web sites display graphical images. Graphical images appearing on the web are typically either in the Graphics Interchange Format ("GIF") or in the Joint Photographic Experts Group ("JPEG") format. GIF is a raster graphics file format that supports two-hundred fifty-six (256) colors. GIF also includes data compression, but because of the color limitation, this graphics format is better suited for illustrations such as scanned images as opposed to color photos. GIF uses a non-lossy compression algorithm, i.e., the images do not lose bits when they are compressed. JPEG, however, uses a lossy compression algorithm for color images. While the JPEG format can reduce files sizes, some detail is lost during the compression process. Another raster format which is gaining popularity is the Portable Network Graphics ("PNG") format. PNG is another pixel based graphics file format similar to GIF. Certain browsers, including Netscape Navigator and Web Explorer, support PNG. In one form of the present invention, the fixed graphical component of the process design data is a GIF file. The use of a GIF file enables shop floor personnel to view but not readily modify the fixed graphical component.

The terms "computer-aided design" or "CAD" means any drawing or design created using a CAD program such as AutoCAD® (AutoCAD is a registered trademark of Autodesk Inc. of Sausalito, Calif.). Unlike a computer image, which is a raster image, a CAD drawing is a vector graphic data file, which is within the class of object-oriented graphic data files. A vector graphic consists of objects such as lines, curves, shapes and text. Each line in the vector graphic is a mathematical curve. Vector graphics are most often used for mechanical drawings and engineering designs because the shapes of the object being designed are transformed into exact mathematical shapes, the shapes of which are represented by mathematical formulas. CAD drawings are often used because of the advantages they provided over hand drawings. In order to transmit hand drawings over the web from one entity to another, the drawings must be scanned with an electronic scanner and saved in a computer as a graphics file. Because the bitmaps resulting from scanners reduce the detail of drawings, data may be lost. Also, pencil drawings and blue-prints may be hard to scan because of the large amount of background information contained in the final image. Lastly, the raster image may become a large data file that takes both a long time to send and receive and takes up a lot of storage space upon being saved. For this reason, the use of vector drawings facilitates the transmission of graphic information over the internet. In one form of the present invention, the modifiable graphical component of the process design data is a vector image created using a CAD program. The use of a CAD program to create vector images enables process engineers to edit the modifiable graphical component of the design data whenever it is deemed necessary to do so.

Illustration programs such as Adobe Illustrator® (Adobe, Illustrator and Adobe Illustrator are registered trademarks of Adobe Systems Incorporated of Palto Alto, Calif.) and CorelDRAW® (CorelDRAW is a trademark of Corel Corporation of Ontario, Canada) are also used to create vector images. In one form of the present invention, the modifiable graphical component of the design data is a vector image created using an illustration program. The creation of vector images using an illustration program enables process engineers to edit the modifiable graphical component of the design data when necessary. In an exemplary embodiment of the present invention, the modifiable graphical component of the design data is an Adobe Illustrator® image.

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical. The terms "wireless application protocol" or "WAP" mean a universal specification to facilitate the delivery and presentation of web-based data on handheld and mobile devices with small user interfaces.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data ("CDPD") used on the Advance Mobile Phone Service ("AMPS").

The EWI system of the present invention provides manufacturing documentation for standardizing product manufacturing in an enterprise. The EWI application is computer software comprised of modules designed to run over the web using a normal browser, e.g., E Microsoft Internet Explorer® or Netscape Navigator®.

Referring to FIG. 1, EWI system 100 includes web server 110 and central file repository 111. Central file repository 111 is accessible by web server 110, includes database table 112 and is housed in central facility 114. Web server 110 is accessible by a plurality of computer workstations 120 over public and private networks 130, 140. Computer workstations 120 each include user display 121 and printer 122. Computer workstations 120 are housed in manufacturing plants 115, 116, 117.

Computer workstations 120 communicate with web server 110 of EWI system 100 over network 130. Network 140 works in conjunction with network 130 to provide private communications between web server 110 and workstations 120. In one form of the present invention, private network 140 is a VPN. As such, private network 140 is a private communication tunnel between computer workstations 120 and EWI system 100 over publicly accessible network 130.

Figure 2:
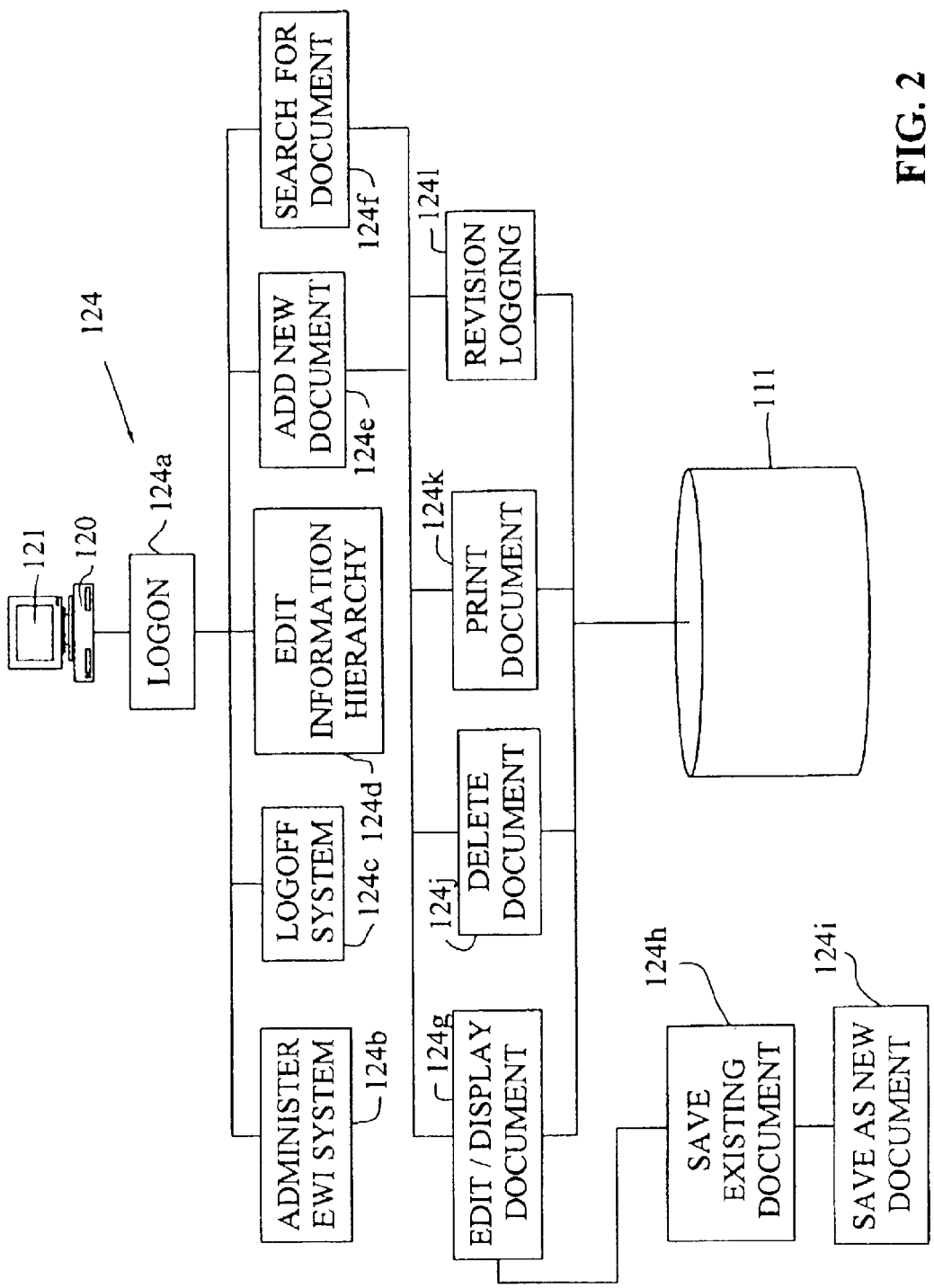
FIG. 2 is a flowchart showing the functionality of the present invention.

FIG. 2 is illustrative of the functionality provided by EWI system 100. Upon invoking EWI system 100 over network 130, 140 at computer workstation 120 located in any of manufacturing plants 115, 116, 117 (FIG. 1), EWI system 100 presents the user with a predetermined view, e.g., either home page 200 or home page 300 (FIGS. 3 and 4), depending on the user's access rights, on user display 121. The user may choose from any of the hyperlinks on home page 200, 300, each of the hyperlinks representing different functions 124 carried out by EWI system 100 (with the exception of the Home hyperlink). EWI system 100 functions 124 include: Logon function 124a, Administer EWI System function 124b, Logoff EWI System function 124c, Edit Information Hierarchy function 124d, Add New Document function 124e, Search for Document function 124f, Edit/Display function 124g, Save Existing Document 124h, Save as New Document 124i, Delete Document function 124j, Print Document function 124k and Revision Logging function 124l.

EWI system 100 provides Logon functionality 124a. Logon function 124a allows users to gain access to EWI system 100. In order to use EWI system 100, a user must first gain access. EWI system 100 uses Windows NT (Windows NT® is a registered trademark of Microsoft Corporation of Redmond, Wash.) challenge/response capabilities to authenticate the user of EWI system 100. EWI system 100 automatically permits the user to logon to system 100 without entering a user name/password. The user, however, must have a valid profile in user profile database 113, the profile being created by an enterprise administrator or automatically added via system 100. Upon logging into EWI system 100 from any of plurality of workstations 120, the user enters a user name and password that authenticates their access to EWI system 100. Upon accessing EWI system 100, system 100 validates the user name and password and provides the user access to EWI system 100 functions 124. If an unknown user name and/or password are provided by the user, system 100 creates a new profile in user profile database 113 using the user name and password.

User account access to central file repository 111 is dictated by the user's role within the manufacturing process. Personnel who have add, change, or delete responsibilities, e.g., process engineers, each have their own central file repository 111 account. Those users who view data, e.g., manufacturing plant personnel or shop floor workers, logon to central file repository 111 from a pool of user names and passwords signifying individual central file repository 111 users. This pool is large enough to accommodate the peak number of concurrent users required at any given times as application users. The pool of central file repository 111 account ids is maintained within user profile database 113 which is maintained in conjunction with EWI system 100. Although the exemplary embodiment of the present invention describes two principal types of users, multiple classes of users may be implemented to provide more granular access rights for the various EWI permissions.

When the user signs on to EWI system 100, system 100 determines whether the user has a role which requires her to have her own central file repository 111 account. The user's role is indicated by a role code in the user's profile as well as a specific user name and password that has been created for her to give her access to central file repository 111. If the user has this combination, the user may access central file repository 111 with her user name and password. If the user has a "view" role, she will be temporarily assigned a user name and password to central file repository 111 from the pool in user profile database 113. EWI system 100 tracks which user currently is using which username/password combination. The user names and passwords correspond to an active account on central file repository 111.

Figure 3:
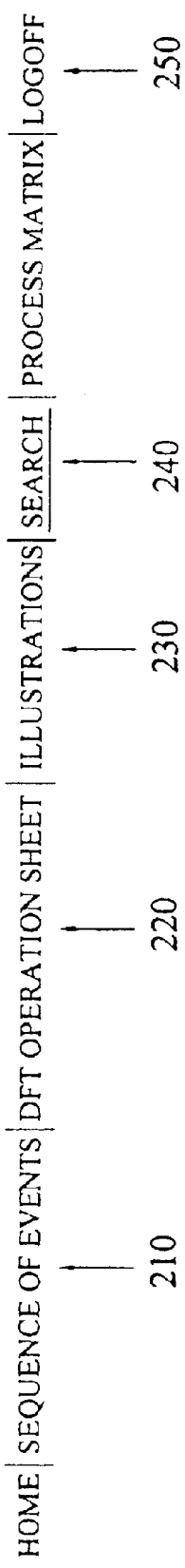
FIG. 3 is a view of the EWI system home page displayed at a computer workstation to users having edit rights.
Figure 4:
FIG. 4 is a view of the EWI system home page displayed at a computer workstation to users having non-edit rights.

Upon the user's accessing of EWI system 100, her user name and password is validated against user profile database 113. If the user name and password are valid, EWI system 100 presents user home page 200 on user display 121, as shown in FIG. 3. If the user name and password are invalid, EWI system 100 creates a profile for the user, assigns the user view privileges only, and then displays home page 200 on user display 121. If the user has a view only account on central file repository 111 and there are no pool accounts left to access central file repository 111, EWI system 100 displays an error message on user interface 121 that tells the user to log in later.

If the user has edit rights to central file repository 111, the user is presented with home page 200 and may select from any of the five (5) following hyperlinks: Sequence of Events 210, DFT Operation Sheet 220, Illustrations 230, Search 240 or Logoff 250. If the user does not have edit rights, the user is presented with home page 300 shown in FIG. 4. This user may select from any of the three (3) DFT Operation Sheet 310, Search 320 or Logoff 330 links.

EWI system 100 also provides Administer EWI System functionality 124b. Administer EWI System function 124b enables EWI system 100 administrator to maintain user profiles and the pool of user ids required for view only users to access central file repository 111. EWI system 100 administrator controls access to central file repository 111 master file account where all source EWI documents are stored. This master file account shares the EWI documents to all other users. EWI system 100 uses database 113 (FIG. 1) to store and maintain user profile data.

EWI system 100 further provides Edit Information Hierarchy functionality 124d. Edit Information Hierarchy function 124d enables limited users with access rights to access and manually change, adjust or make corrections to the folders and files that make up central file repository 111.

EWI system 100 provides Add New Document functionality 124e as well. Add New Document function 124e enables EWI system 100 user to add a SOE document, create an OMS document or add graphic illustration files and store those documents in central file repository 111. FIG. 3 shows home page 200 presented to a user with edit rights. Upon being presented with home page 200, the user may select option Sequence of Events 210. Selecting option 210 presents the user with SOE data entry web page 400 shown in FIG. 5. SOE data entry web page 400 allows the user to create a new SOE by entering SOE identification information. This information includes part number data 410, line number data 411, cell data 412, process ID data 413, SOE filename data 414, SOE content data 415, and comment data 416. After entering the SOE identification information, the user uploads the new SOE document over networks 130, 140 130 to central file repository 111 for storage.

A user with edit rights may also select option DFT Operation Sheet 220. Selecting option 220 presents the user with OMS data entry web page 500 shown in FIG. 6. OMS data entry web page 500 allows the user to create a new OMS document or modify/delete an existing OMS document. A user creates a new OMS document by entering in the necessary OMS information, including process id data 513, rep. part no data 510, operation number data 514 and illustration number 515.

Line data 511 is the line on which the product is being produced in a given facility. Cell data 512 is the cell within the line on which the product is being produced. Process id data 513 is the process identified in the product synchronization phase of the DFT implementation. Process id data 513 also corresponds to process data id 413 found on the SOE document. Rep. part no data 510 is representative of a group of products that require the same work content and an equal amount of time within a given process. Operation number data 514 is a three (3) digit integer that identifies the operation that the task is placed in during the Operational Definition exercise of DFT implementation. Illustration number 515 identifies the corresponding graphical image that is being stored for a particular process id, rep. part no, operation, line and cell.

After the user enters the OMS identifying information, she is able to retrieve illustration 520 that was uploaded to central file repository 111 under the same OMS identifying information. EWI system 100 recognizes the match and retrieves product illustration 520 for inclusion in OMS data entry web page 500. The user then adds the necessary Bill of Material ("BOM") data 521, PCO data 516, revision date data 517 and comment data 519.

BOM data 521 includes find number data 521a, part number data 521b, description data 521c and part quantity data 521d. Find number data 521a represents a specific part referenced on product illustration 520. Find number data 521a is taken from product illustration 520. Part number data 521b is the BOM part number assigned to the part. Description data 521c is the description of the part referenced in product illustration 520. Part quantity data 521d is the numeric quantity of the referenced part used in the operation depicted by product illustration 520.

PCO data 516 represents a revision of an OMS document. The prefix of PCO data 516 indicates the location of manufacturing plant 115, 116, 117 (FIG. 1) in which a revision has been made. For example, the prefix "2" may indicate that an OMS document is being revised in a plant located in Ann Arbor, Mich. In this way, the prefix "3" may indicate that the OMS document has been revised in a different plant located in Detroit, Mich. The suffix of PCO data 516 indicates the number of revisions that have been made to the OMS document. Uppercase letters are used in sequence beginning with "A" and omitting letters "I", "O", "Q", "S", "X" and "Z". When the single letters have been exhausted, the revisions following "Y" are "AA", "AB" through "AY". After "AA" through "AY" have been exhausted, the next sequence is "BA", "BB", etc. For example, the suffix "A" indicates that an OMS document has been revised one (1) time. The suffix "D" indicates that the OMS document has been revised four (4) times.

Date revision data 517 indicates the date which the OMS document is effective. Comment data 519 is reserved for adding additional comments to reference source information. After the user finishes entering BOM data 521, PCO number data 516, date data 517 and comment data 519, she saves OMS data entry web page 500 and uploads it over networks 130, 140 to central file repository 111 for storage.

Depending upon the group of users to which a user of EWI system 100 belongs, EWI system 100 provides a first group of users with a "fixed graphical component" of EWI documents for viewing and provides a second group of users with a "modifiable graphical component" of EWI documents for both viewing and/or editing. For purposes of the present invention, the term "fixed graphical component" refers to any graphical data that is configured only to be viewed with a viewer, e.g., a browser via a computer workstation monitor. The person viewing the "fixed" graphical data is configured to neither add to nor delete from the graphical data. For example, a recipient of the fixed graphical component may be provided with a GIF file and the ability to load the GIF file in a viewer. Alternatively, the recipient of the fixed graphical component may be given a CAD file in a read only mode and provided with a view only program. In either case, the fixed graphical component recipient may only view the file on his workstation monitor and is not configured to edit or otherwise modify the graphical information. In this way, the graphical component is "fixed."

Contrarily, and also for purposes of the present invention, the term "modifiable graphical component" refers to any graphical data that is configured for editing or revising using editor software. The recipient of the modifiable graphical data may either add to or delete from the graphical data. For example, the modifiable graphical component recipient may obtain a CAD drawing. The recipient is configured to access a CAD editor program on her workstation, and the recipient user may add to, delete from, or otherwise modify the CAD drawing. In this way, the graphical component is "modifiable."

In an exemplary embodiment of the present invention, the first group of users includes manufacturing shop floor personnel, and the second group of users includes process engineers. The fixed graphical component of the EWI documents includes OMS display illustration 616, and the modifiable graphical component of the EWI documents includes OMS source illustration 617.

In one form of the present invention, a user belonging to the first group of EWI system 100 users may only view OMS display illustration 616. For example, a manufacturing shop floor worker may view OMS display illustration 616 while assembling a product on the floor of a manufacturing plant. In doing so, the manufacturing shop floor worker uses computer workstation 120 to access web server 110 over public and private networks 130, 140. Web server 110 then presents the shop floor worker with home page 200 on a browser viewable on user display 121. After selecting Search hyperlink 320, EWI system 100 links the shop floor worker to Search page 700 whereupon the shop floor worker may opt to search for the OMS document which contains OMS display illustration 616 the shop floor worker wishes to view. Upon completing her search of central file repository 111 for the OMS document, the shop floor worker is presented with OMS web page 800.

In another form of the present invention, a user belonging to the second group of EWI system 100 users may view, edit or both view and edit OMS source illustration 617. For example, a process engineer may wish to view OMS source illustration 617 while designing a similar process design at an engineering site. In doing so, the process engineer, having view rights, uses computer workstation 120 to access web server 110 over public and private networks 130, 140. Web server 110 then presents the process engineer with home page 200 on a browser viewable on user display 121. After selecting Search hyperlink 240, EWI system 100 links the process engineer to Search page 700 whereupon the process engineer may opt to search for the OMS document which contains OMS source illustration 617 that the process engineer wishes to view. Upon completing her search of central file repository 111 for the OMS document, the process engineer is presented with OMS web page 500. The process engineer may then view OMS source illustration 617 in product illustration 520 portion of web page 500. In another example, the process engineer may wish to edit OMS source illustration 617. In this instance, the process engineer, also having edit rights, accesses web server 110 and again uses Search hyperlink 240 to link to Search page 700. The process engineer may then search EWI system 100 for the OMS document which contains OMS source illustration 617 that the process engineer wishes to edit. Upon completing her search of central file repository 111 for the OMS document, the process engineer downloads OMS source illustration 617 to computer workstation 120. In this way, the process engineer may edit OMS source illustration 617 using software installed either on computer workstation 120 or a network accessible via computer workstation 120. After editing OMS source illustration 617, the process engineer uploads the graphical information back to central file repository 111 to be used in OMS documents.

Figure 7:
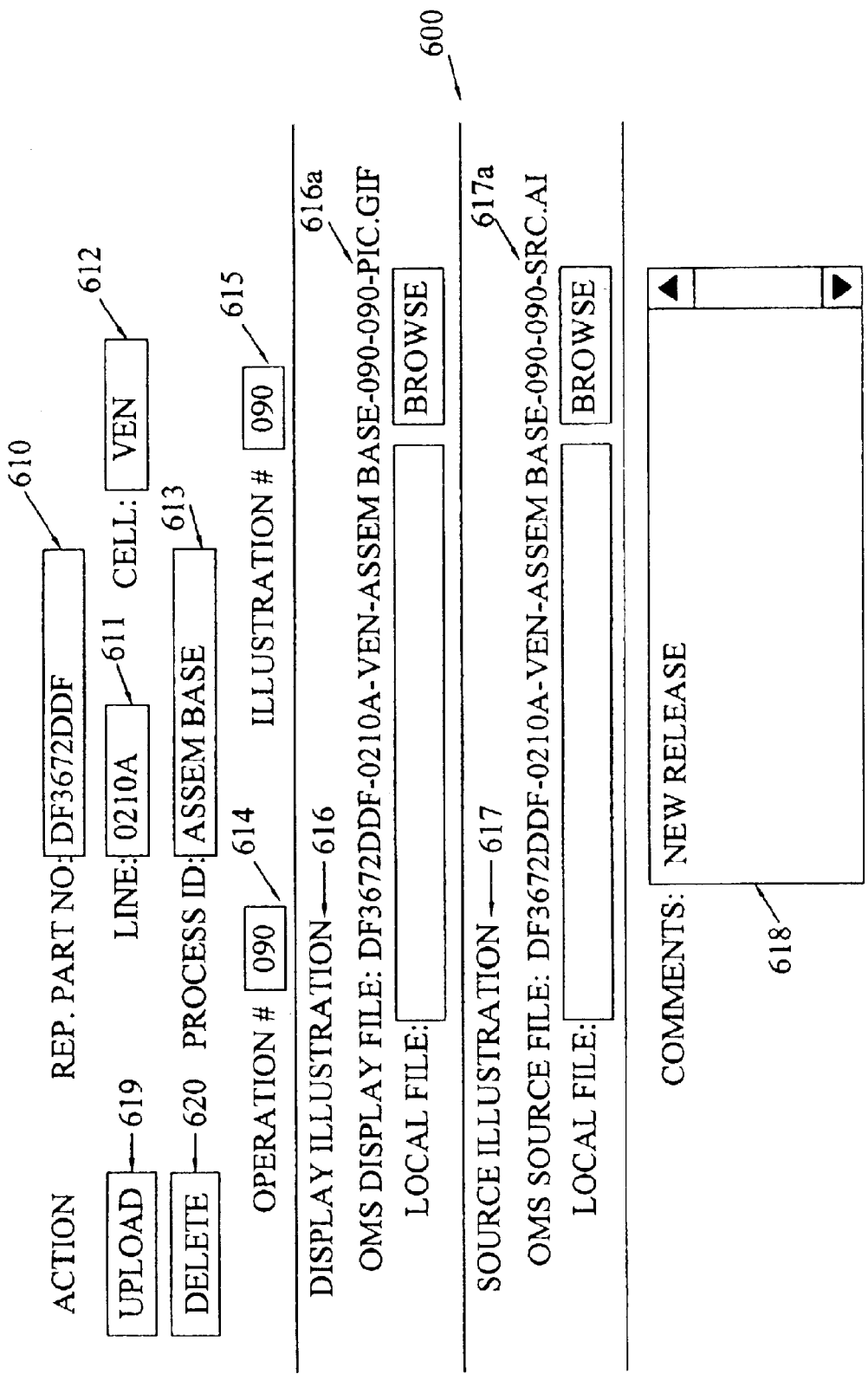
FIG. 7 is a view of the illustration data entry page displayed at a user workstation enabling a user to upload new illustrations to be used in the OMS.

As shown in FIG. 3, a user with edit rights may also select hyperlink Illustrations 230. Selecting hyperlink 230 presents users with illustration data entry web page 600 (FIG. 7) and enables users with author rights to upload OMS display illustration 616 and OMS source illustration 617 to EWI system 100. EWI system 100 provides OMS display illustration 616 to a first group of individuals of the enterprise who have access rights which enable them to view OMS display illustration 616. This group of individuals often consists of manufacturing plant personnel or shop floor workers. OMS display illustration 616 is uploaded to EWI system 100 as a GIF file and is used as a display file for an OMS document. For example, the shop floor workers may view OMS display illustration 616 in an OMS document on the manufacturing plant floor as the workers assemble the part being manufactured. In one form of the present invention, OMS display illustration 616 is a scanned image. In another form of the present invention, OMS display illustration 616 is a digital photo.

EWI system 100 provides OMS source illustration 617 to a second group of individuals of the enterprise who have access rights which enable them to both view and modify OMS source illustration 617. This group of individuals often consists of process engineers or others who draft process designs used by manufacturing plant personnel to assemble products. OMS source illustration 617 is uploaded to EWI system 100 as a graphics file, used as a source reference, and then downloaded back to the software application used to create the graphics file when modifications are necessary. OMS source illustration 617 is then uploaded back to EWI system 100 for OMS document usage. For example, process engineers may use OMS source illustration 617 to create new process designs, or they may need to modify OMS source illustration 617 in an already existing process design. In one form of the present invention, OMS source illustration 617 is a vector drawing, i.e., an AI graphics file.

A user uploads illustrations 616, 617 to EWI system 100 by first entering illustration information into illustration data entry web page 600. Illustration information includes rep. part no data 610, line data 611, cell data 612, process id data 613, operation number data 614, illustration number data 615, OMS source display file data 616a and OMS source file data 617b. After the information is entered into illustration data entry page 600, page 600 is uploaded over networks 130, 140 to EWI system 100 for storage.

Line data 611 is the line on which the product is being produced in a given facility. Cell data 612 is the cell within the line on which the product is being produced. Process id data 613 is the process identified in the product synchronization phase of the DFT implementation. Rep. part no data 610 is a group of products that require the same work content and equal amount of time with a given process. Operation number data 614 identifies the operation which the task is placed in during the Operational Definition exercise of DFT implementation. Illustration number 615 identifies the corresponding graphical image that is being stored for a particular process id, rep. part no, operation, line and cell. OMS display file data 616a identifies the file path of OMS display illustration 616 being uploaded to EWI system 100. In an exemplary embodiment of the present invention, OMS display illustration 616 is a GIF file. OMS source file data 617a identifies the file path of OMS source illustration 617 being uploaded to EWI system 100. In an exemplary embodiment of the present invention, OMS source illustration 617 is an Adobe Illustrator® ("AI") image (Adobe, Illustrator and Adobe Illustrator is a registered trademark of Adobe Systems Incorporated of Palto Alto, Calif.). AI is computer software allowing used to create graphics for use in print or on the web.

In one form of the present invention, after the user enters the illustration information into illustration data entry page 600, she uploads OMS display file data 616a to web server 110 as a GIF file, and it is used as display illustration 616 for the OMS document. For example, a process engineer may enter illustration information into illustration data entry page 600 and then upload OMS display file data 616a to web server 110 as a GIF file. Shop floor worker may then reference the OMS document, which includes display illustration 616, as they assemble a product on the shop floor. By viewing display illustration 616 of an assembled product, the shop floor workers are better able to determine how different parts work together to form an assembled product.

In another form of the present invention, after the user enters the illustration into illustration data entry page 600, she uploads OMS source file data 617a to web server 110 as OMS source illustration 617. After OMS source illustration 617 has been used by process engineers as a source reference, OMS source illustration 617 is then downloaded to an AI application when modifications need to be made to source illustration 617. OMS source illustration 617 is then uploaded back to web server 110 for OMS usage. For example, a process engineer may view OMS source illustration 617 as a source reference while creating a process design for a product similar to the product illustrated in OMS source illustration 617. If the process engineer determines that OMS source illustration 617 needs to be modified, OMS source illustration 617 may be downloaded to an AI application wherein OMS source illustration 617 may be modified by a user having edit rights.

Figure 8:
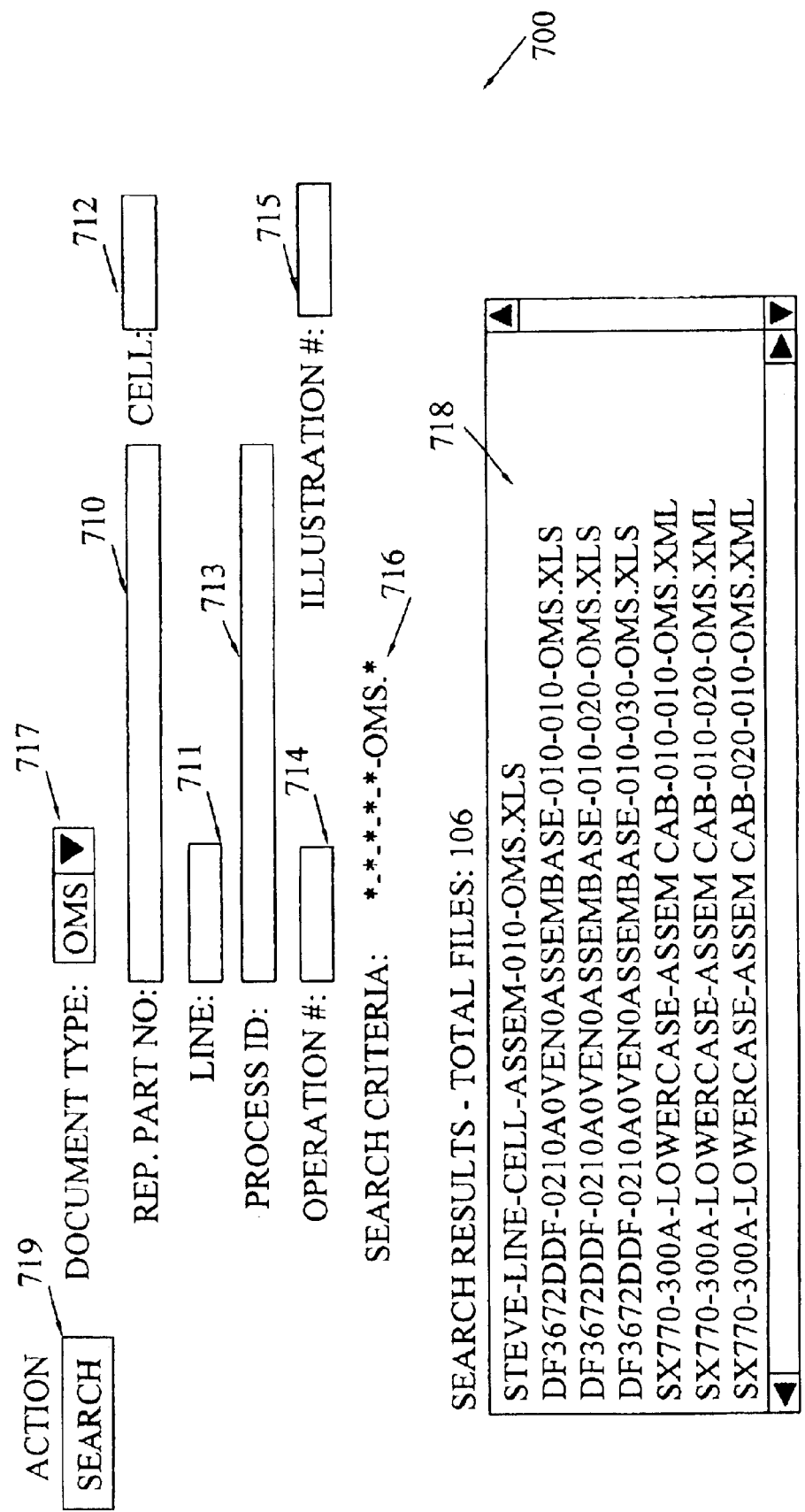
FIG. 8 is a view of the search page displayed at a user workstation enabling a user to search the EWI system for a particular EWI document.

The method and system of the present invention provides Search for Document functionality 124f. A user may invoke Search for Document function 124f by selecting Search 240 hyperlink on home page 200. Selecting hyperlink 240 presents the user with search page 700 (FIG. 8). Search page 700 allows the user to locate and display existing OMS documents, SOE documents, graphic illustrations and/or PMS documents in central file repository 111. A user searches for one of the above-mentioned documents by using the following fields to identify the specific document: rep. part no data 710, line data 711, cell data 712, process id data 713, operation number 714, illustration number 715 and document type data 717.

Line data 711 is the line on which the product is being produced in a given facility. Cell data 712 is the cell within the line on which the product is being produced. Process id data 713 is the process identified in the product synchronization phase of the DFT implementation. Process id data 713 also corresponds to process data id 413 found on the SOE document. Rep. part no data 710 is representative of a group of products that require the same work content and an equal amount of time within a given process. Operation number data 714 identifies the operation that the task is placed in during the Operational Definition exercise of DFT implementation. Illustration number 715 identifies the corresponding graphical image that is being stored for a particular process id, process family and operation. Document data type data 717 identifies the type of document that is stored within central file repository 111 of EWI system 100. In an exemplary embodiment of the present invention, document data types data 717 includes SOE, OMS, ORG, PIC and MAT.

In utilizing search page 700, a user may enter parameter data in one or more of the seven (7) data fields. After entering the data and clicking on search button 719, EWI system 100 forwards the parameter data for searching to central file repository 111. Central file repository 111 returns list 718 of applicable files based on the search parameters. Once list 718 is displayed, the user may select a specific EWI document or restart the searching process by reentering data in the date entry fields. If the user selects an EWI document from list 718, EWI system 100 displays the appropriate document screen based on the document type. If no documents are found in central file repository 111 matching the search criteria entered by the user, then EWI system 100 displays an error condition and redisplays search data entry screen 700. Selecting an EWI document from list 718 also takes the user directly to web page 800, the printable version of the OMS document.

The present invention also provides Edit/Display Document functionality 124g. After EWI system 100 searches central file repository 111 for the SOE, OMS or PMS document selected by the user, Edit/Display Document function 124g enables the user to display the document on user display 121 for viewing or editing. Edit functions are displayed based on the user's privileges stored in user profile database 111. If the user does not have edit rights, EWI system 100 displays the selected document on user display 121 for viewing. Once the selected document is displayed, the user may select an option to edit the existing document. Fields identifying the document, including process id, rep. part no, operation number and illustration number are not editable fields. These fields are only created when the document is in EWI system 100 and named to correspond to the filed content.

Figure 6:
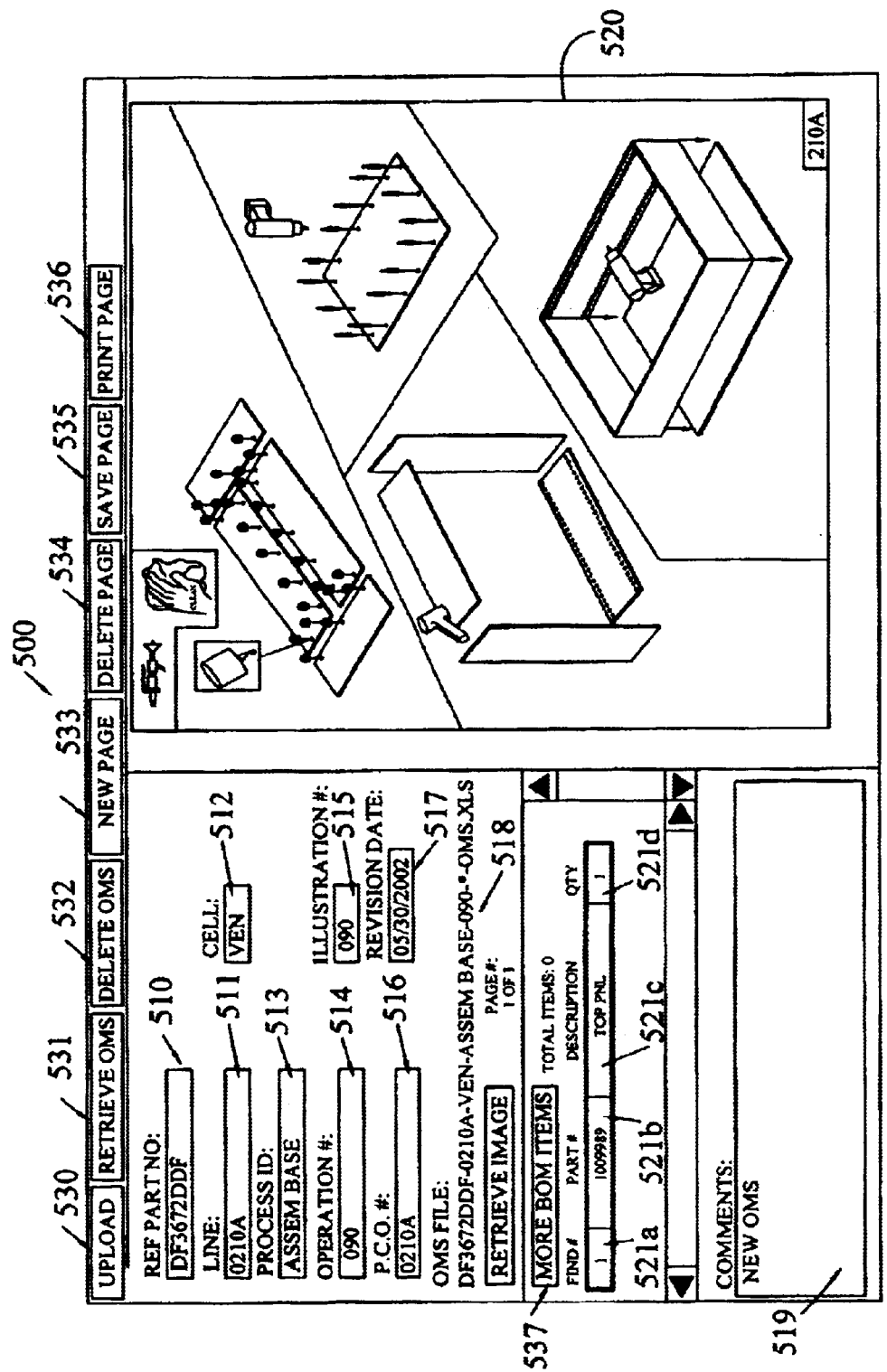
FIG. 6 is a view of the OMS data entry page displayed at a user workstation enabling a user to create or edit a new OMS.

Shown in FIG. 6, OMS data entry page 500 may be used to edit an OMS document in addition to creating an OMS document. OMS data entry page 500 includes the following buttons: Upload OMS 530, Retrieve OMS 531, Delete OMS 532, New Page 533, Delete Page 534, Save Page 535, and Print Page 536. A user may choose to add additional items to an OMS document. For example, if the user needs to enter a number of BOM data 521 that exceeds the list parameters, EWI system 100 provides button 537 to create more BOM data 521 via a scrollable entry list. Using button Upload OMS 530 invokes Save Existing Document function 124h (FIG. 2). In this way, if the OMS document is an existing document that was edited, EWI system 100 replaces the existing OMS document in central file repository 111. For example, a user may access a particular OMS document by using button Retrieve OMS 531. Once OMS data entry page 500 is displayed on display screen 121, the user may make changes to comments data 519. The user may then select Upload OMS 530 to save the current changes to comments data 519 and replace the existing OMS document in central file repository 111 with the new OMS document containing updated comment data 519.

If new graphic data needs to be added to an OMS document, the user may also add an additional page to the OMS document via button New Page 533. Using button New Page 533 invokes Save As New Document functionality 124i (FIG. 2). In this way, EWI system 100 saves the OMS document with the updated graphics data as a new document. For example, a user may access OMS data entry page 600 by using button New Page 531. Once OMS data entry page 600 is displayed on display screen 121, the user may add OMS Display File data 616a and OMS Source File data 617a to an OMS document. When menu button New Page 533 is used, EWI system 100 adds the new OMS page containing new OMS Display File data 616a and OMS Source File data 617a to the end of the document after the last existing page.

Figure 5:
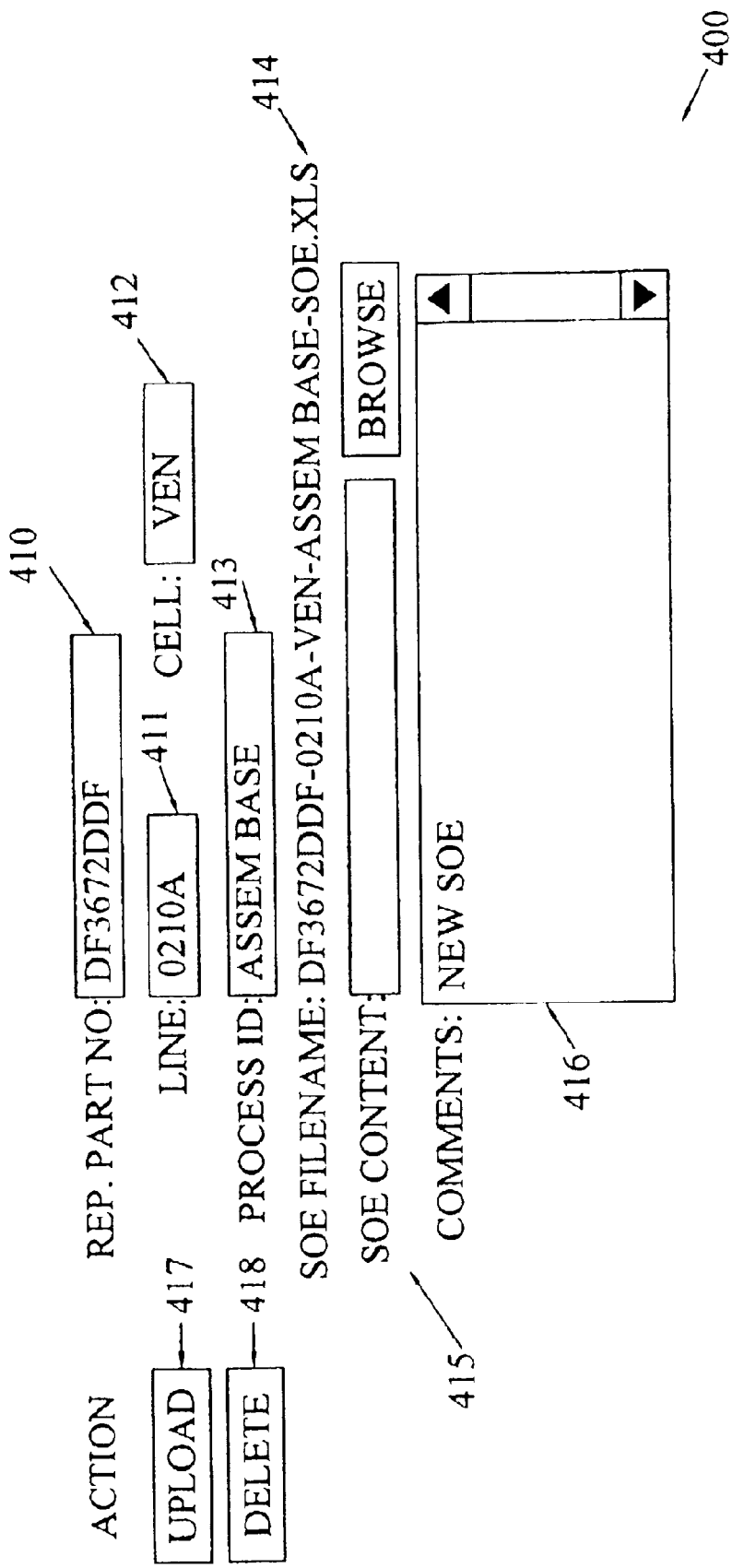
FIG. 5 is a view of the SOE data entry page displayed at a user workstation enabling a user to create or edit a new SOE.

Shown in FIG. 5, a user of the present invention may also edit a SOE document. SOE data entry page 400 includes buttons Upload 417 and Delete 418. Changes to a SOE document may only be made on local computer workstation 210. The user may then use button Upload 417 to upload the edited SOE document to central file repository 111 over networks 130, 140.

The present invention also provides Delete Document functionality 124j. Delete Document functionality 124j enables a user of EWI system 100 to delete EWI documents. Search for Document functionality 124f is used to select the OMS document to be deleted. Once located, the document is displayed as OMS data entry page 500 shown in FIG. 7. The user may then select Delete button 620. Once Delete button 620 is selected, EWI system 100 prompts the user with a message requesting verification of the deletion. If the user clicks "OK," the system accesses central file repository 111 and performs Delete Document function 124j. Delete Document function 124j removes the OMS document from central file repository 111.

The user of the present invention may also delete an OMS page from an EWI document if the page is no longer required. Delete Page button 534 is displayed on OMS data entry page 500. Upon selection, EWI system 100 prompts the user to verify deletion and then deletes the displayed page. The page immediately following the deleted page is then displayed. If there are only two pages, the remaining page is then displayed. If there is only one page, EWI system 100 provides an error message indicating that button Delete Page button 534 can only be used to delete documents.

Figure 10:
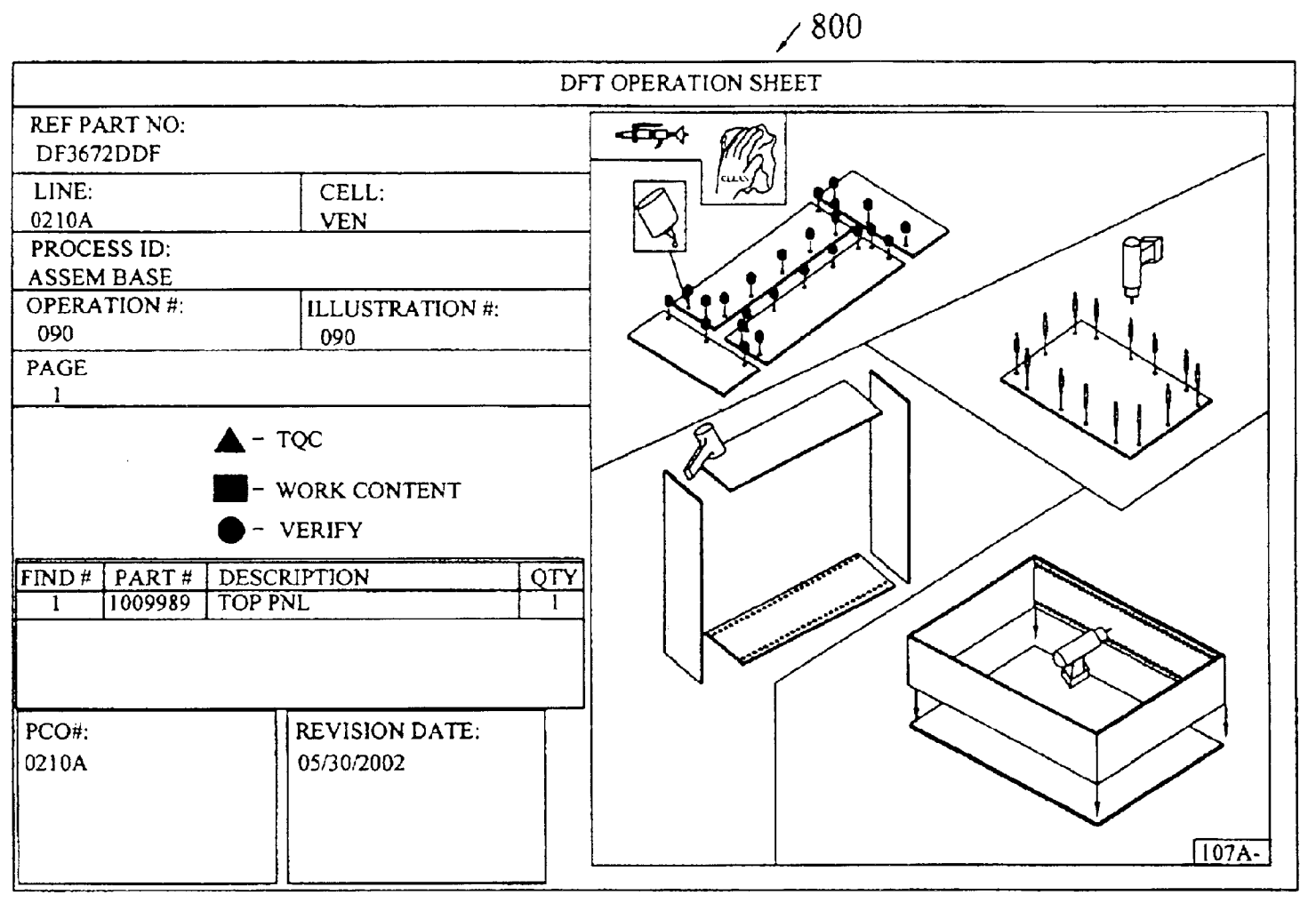

EWI system 100 furthers provides a user with Print Document functionality 124k. Accordingly, EWI system 100 enables a user to print one or more copies of an OMS or a SOE document. The user gains access to Print Document functionality 124k from Add New Document function 124e or Edit/Display Document function 124g. For example, referring to FIG. 6, the user may use button Print Page 536 to print the OMS document shown on OMS data entry page 500. Once printed on workstation printer 122 (FIG. 1), the user may view the printed document displayed in FIG. 10.

EWI system provides Revision Logging functionality 124l as well. EWI system 100 maintains revision information related to documents stored in central file repository 111. Revision Logging functionality 124l is utilized within Add New Document function 124e, Edit/Display Document 124g and Delete Document function 124j. Shown in FIG. 1, EWI system 100 stores in database table 112 a log of each transaction completed by the user which is related to a SOE, an OMS, a PMS document or a graphics illustration. In this way, EWI system 100 maintains a revision log of all document additions, deletions and changes completed within EWI system 100. System 100 assumes that all documents accessed within system 100 are the current versions of those documents. Multiple revision copies of revised SOE, OMS, PMS and graphic illustration documents are not stored by EWI system 100. Database table 112 captures additions, deletions and changes made to the documents as these edits are completed by EWI system 100. Database table 112 maintains document name data, user name data, transaction type data and log item date data.

Upon completion of Add New Document function 124e, Edit/Display Document function 124g or Delete Document function 124j, Revision Logging function 124l is accessed by one of aforementioned functions 124e, 124g, 124j. EWI system 100 provides database table 112 with information from specific data entries on respective data entry pages 400, 500, 600, 700 and generates dates and other information as required to complete a log entry to add to database table 112. Once the log entry is added to revision log table 112, EWI system 100 returns control to function 124e, 124g, 124j that accessed it.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing documentation for standardizing product manufacturing in an enterprise, comprising the steps of:

(a) creating a data record representing work instructions, said data record including process design data, said process design data having a fixed graphical component, and a modifiable graphical component;

(b) providing access to said fixed graphical component of said process design data to a first group of individuals of the enterprise for viewing; and (c) limiting access to said modifiable graphical component of said process design data to a second group of individuals of the enterprise for at least one of viewing and modification.

2. The method of claim 1 wherein said fixed graphical component includes raster graphic data.

3. The method of claim 1 wherein said modifiable graphical component includes object-oriented graphic data.

4. The method of claim 1 wherein the first group of individuals includes manufacturing shop floor personnel.

5. The method of claim 1 wherein the second group of individuals includes process engineers.

6. The method of claim 1 wherein said data record is stored in a database.

7. The method of claim 6 wherein said database is accessible by a plurality of computer workstations over a network.

8. The method of claim 7 wherein the network includes a publicly accessible network.

9. The method of claim 7 wherein the network includes a private network.

10. The method of claim 6 wherein said database may be searched for particular data records.

11. The method of claim 6 wherein said database includes a revision log table.

12. The method of claim 11 wherein said revision log table maintains a log of additions, changes and deletions made to said data record.

13. The method of claim 11 wherein said revision log table includes transaction data, said transaction data including document data, name data, transaction type data and date data.

14. A product manufacturing information system for an enterprise, comprising:

(a) a server accessible by individuals of the enterprise;

(b) a database accessible by said server, said database including a data record, said data record including process design data, said process design data having a fixed graphical component and a modifiable graphical component, the-server further having access software, said access software limiting access to said modifiable graphical component to a first predetermined group of individuals in the enterprise and providing access to said fixed graphical component to a second predetermined group of individuals in the enterprise.

15. The system of claim 14 wherein said fixed graphical component includes raster graphic data.

16. The system of claim 14 wherein said modifiable graphical component includes object-oriented graphic data.

17. The system of claim 14 wherein said fixed graphical component is accessible by manufacturing shop floor personnel.

18. The system of claim 14 wherein the first predetermined group of individuals includes process engineers.

19. The system of claim 14 wherein said server is accessible by a plurality of computer workstations over a network.

20. The system of claim 19 wherein said network includes a publicly accessible network.

21. The system of claim 19 wherein said network includes a private network.

22. The system of claim 14 wherein said server includes software for searching said database for particular data records.

23. The system of claim 14 wherein said server creates or maintains multiple user groups.

24. The system of claim 23 wherein said server provides said user groups with predetermined access rights, said predetermined access rights enabling said user groups to execute at least one of a view and modify action to a data record included in said database.

25. The system of claim 14 wherein said database includes a revision log table.

26. The system of claim 25 wherein said revision log table maintains a log of additions, changes and deletions made to said data record.

27. The system of claim 25 wherein said revision log table includes transaction data, said transaction data including document data, name data, transaction type data and date data.

28. A machine-readable program storage device for storing encoded instructions for a method of manufacturing documentation for standardizing product manufacturing in an enterprise, comprising the steps of:

(a) creating a data record representing work instructions, said data record including process design data, said process design data having a fixed graphical component, and a modifiable graphical component;

(b) providing access to said fixed graphical component of said process design data to a first group of individuals of the enterprise for viewing; and (c) limiting access to said modifiable graphical component of said process design data to a second group of individuals of the enterprise for at least one of viewing and modification.

29. The machine-readable program storage device of claim 28 wherein said fixed graphical component includes raster graphic data.

30. The machine-readable program storage device of claim 28 wherein said modifiable graphical component includes object-oriented graphic data.

31. The machine-readable program storage device of claim 28 wherein the first group of individuals includes manufacturing shop floor personnel.

32. The machine-readable program storage device of claim 28 wherein the second group of individuals includes process engineers.

33. The machine-readable program storage device of claim 28 wherein said data record is stored in a database.

34. The machine-readable program storage device of claim 33 wherein said database is accessible by a plurality of computer workstations over a network.

35. The machine-readable program storage device of claim 34 wherein the network includes a publicly accessible network.

36. The machine-readable program storage device of claim 34 wherein the network includes a private network.

37. The machine-readable program storage device of claim 33 wherein said database may be searched for particular data records.

38. The machine-readable program storage device of claim 33 wherein said database includes a revision log table.

39. The machine-readable program storage device of claim 38 wherein said revision log table maintains a log of additions, changes and deletions made to said data record.

40. The machine-readable program storage device of claim 38 wherein said revision log table includes transaction data, said transaction data including document data, name data, transaction type data and date data.

41. The system of claim 14 wherein the second predetermined group of individuals includes manufacturing shop floor personnel.

* * * * *

UNITED STATES PATENT AND TRADEMARK OFFICE
CERTIFICATE OF CORRECTION

PATENT NO.    : 6,819,965 B2
DATED         : November 16, 2004
INVENTOR(S)   : James K. Beatty et al.

It is certified that error appears in the above-identified patent and that said Letters Patent is hereby corrected as shown below:

Title page,
Item [75], Inventors, "James K. Beatty" and "Dennis Thimling" reference, delete "ID" and insert -- IN --.

Signed and Sealed this

Eighth Day of March, 2005

JON W. DUDAS
*Director of the United States Patent and Trademark Office*